United States Patent [19]

Mouttet

[11] 3,857,303

[45] Dec. 31, 1974

[54] EPICYCLIC GEAR BOXES

[75] Inventor: Andre Mouttet, Billancourt, France

[73] Assignees: Regie Nationale des Usines, Billancourt, France; Ste des Automobiles Peugeot, Paris, France

[22] Filed: Apr. 2, 1973

[21] Appl. No.: 347,929

[30] Foreign Application Priority Data
Aug. 6, 1972  France .............................. 72.20670

[52] U.S. Cl. .................................... 74/761, 74/767
[51] Int. Cl. .......................................... F16h 57/10
[58] Field of Search ....................... 74/761, 767, 760

[56] References Cited
UNITED STATES PATENTS

| | | | |
|---|---|---|---|
| 2,277,214 | 3/1942 | Dodge | 74/761 |
| 2,570,327 | 10/1951 | Dodge | 74/761 |
| 3,063,309 | 11/1962 | Grattan | 74/761 X |
| 3,108,495 | 10/1963 | Winchell | 74/761 |
| 3,513,722 | 5/1970 | Mori et al. | 74/761 X |

FOREIGN PATENTS OR APPLICATIONS
738,590  10/1955  Great Britain ..................... 74/767

Primary Examiner—Samuel Scott
Assistant Examiner—John Reep
Attorney, Agent, or Firm—Stevens, Davis, Miller & Mosher

[57] ABSTRACT

An epicyclic gear box with four forward gear ratios and one reverse gear ratio comprises three sun gears and a planet gear carrier with two sets of planet gears, the gears of the two sets being in mesh. The first sun gear is in mesh with the first set of planet gears and the second and third sun gears are in mesh with the second set of planet gears. A respective immobilizing device is associated with the second and third sun gears, and with an annulus gear meshing with the first set of planet gears. The immobilizing devices and clutches incorporated in the gear box are selectively operative to provide the desired gear ratio.

3 Claims, 3 Drawing Figures

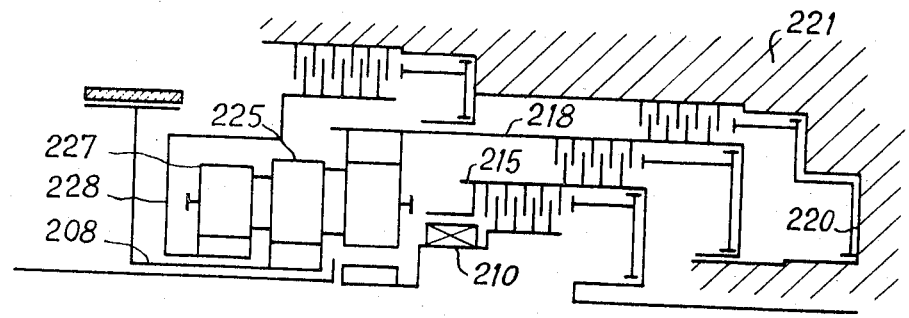
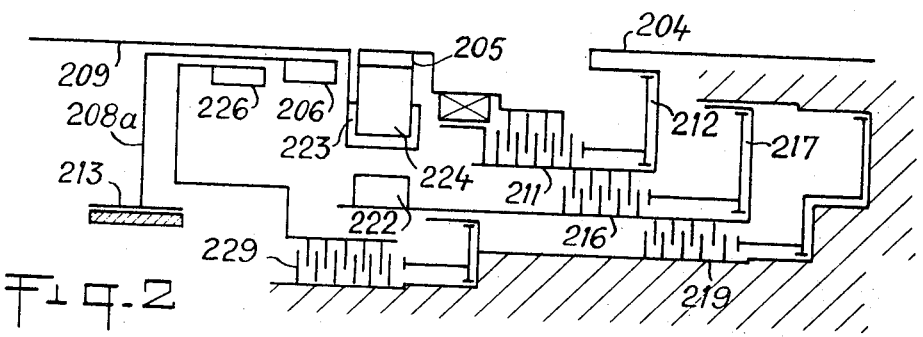
Fig-2
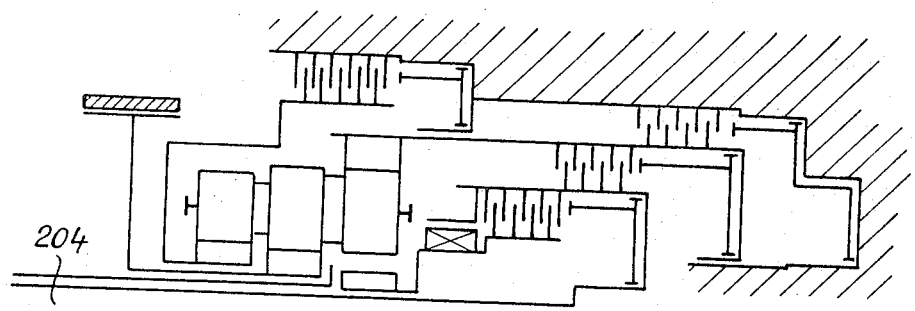
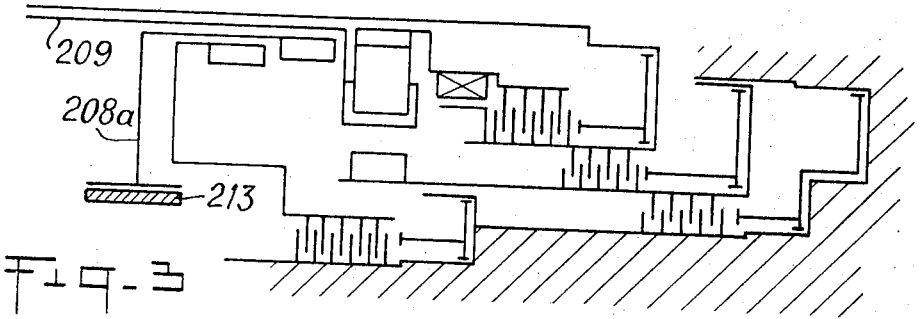
Fig-3

EPICYCLIC GEAR BOXES

BACKGROUND OF THE INVENTION

1. Field of the Invention

The present invention relates to epicyclic gear boxes.

2. Description of the Prior Art

One previously proposed epicyclic gear box comprises driving and driven shafts arranged on the same axis, two central sun gears, an internally-toothed annulus gear and a planet carrier which carries two sets of planet gears in which each planet of the first set meshes with a corresponding planet of the second set, and the planets of the first set mesh with the first sun gear and the planets of the second set mesh simultaneously with the second sun gear and with the annulus gear.

The gear change mechanism also comprises two clutch devices, two immobilizing devices and a free wheel, by which the gear box can be controlled to provide three forward speed ratios and one reverse speed ratio.

SUMMARY OF THE INVENTION

According to the present invention, there is provided in an epicyclic gear box having four forward speed ratios and one reverse speed ratio, input shaft means, output shaft means, first sun gear means, second sun gear means, annulus gear means, planet gear carrier means, first planet gear means carried by two carrier means, second planet gear means carried by the carrier means, said first and second planet gear means being in mesh, said first planet gear means being in mesh with the first sun gear means, and said second planet gear means being in mesh with the second sun gear means and with the annulus gear means, a first immobilizing device, a second immobilizing device, and clutch means, the improvement comprising third sun gear means, and a third immobilizing device, said third sun gear means co-operating with the third immobilizing device whereby the third immobilizing device is operative to selectively hold stationary the third sun gear means, and the third sun gear means meshing with the second planet gear means, said immobilzing devices and said clutch means being selectively operative to provide the selected forward or reverse speed ratio.

BRIEF DESCRIPTION OF THE DRAWINGS

Embodiments of the invention will now be described, by way of example only, with reference to the accompanying diagrammatic drawings, in which:

FIG. 2 shows schematically, a gear box in accordance with the invention;

FIG. 3 shows a modified form of the gear box of FIG. 1.

DESCRIPTION OF THE PREFERRED EMBODIMENTS

Figure 1:
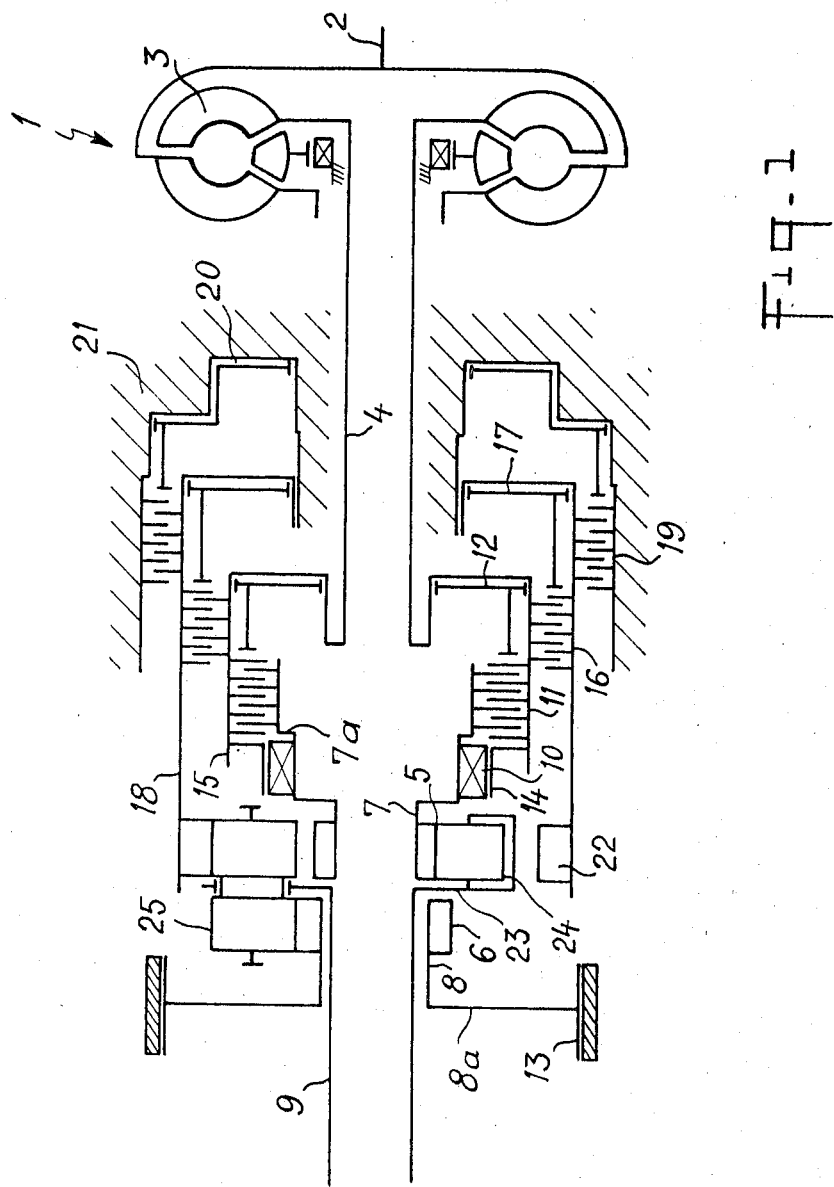
FIG. 1 shows schematically one previously proposed gear box.

As shown in FIG. 1, the previously proposed gear box is coupled to the crankshaft 2 of an engine by a hydraulic torque converter 1, the output rotor 3 of the converter being rigid with the input shaft 4 of the gear box.

The shaft 4 is rigid with a casing 15 which carries an outer ring 14 of a free wheel unit 10 having a rotary hub in the form of an extension 7a of a sleeve 7 to which a first sun gear 5 is keyed.

Following the sleeve 7 and on the same axis there is provided a sleeve 8 on which a second sun gear 6 is keyed and which carries a radial extension 8a forming a rotary drum or hub of a first brake or other immobilizing device 13. An output or driven shaft 9 is rotatable inside the sleeve 8 and is rigid with a planet carrier 23 on which are mounted a first set of planet gears 24 which mesh with the sun gear 5 and a second set of planet gears 25 which mesh with the second sun gear and an annulus gear 22 mounted on a rotary casing 18.

Each planet gear 25 of the second set meshes with a corresponding planet gear 24 of the first set.

The extension 7a of the sleeve 7 also constitutes a rotary hub of a first multi-disc clutch 11 controlled by a hydraulic cylinder 12. The casing 15 carries on its inner surface the driving discs of the first clutch and on its outer surface the driving discs of a second clutch 16 which is controlled by a hydraulic cylinder 17. The driven discs of the second clutch 16 are carried by the casing 18. The casing 18 is provided on its outer surface with movable discs of a second immobilizing device 19 which is controlled by a hydraulic cylinder 20, the device 19 having fixed discs rigid with a casing 21 of the mechanism.

The manner of operation of the gear box can be seen from the following Table I, in which x describes those members which are actuated.

|   | 11 | 16 | 10 | 13 | 19 |
|---|----|----|----|----|----|
| 1 |    |    | x  | x  |    |
| 2 |    | x  |    | x  |    |
| 3 | x  | x  |    |    |    |
| Reverse | x |  |    |    | x  |

I.

The first transmission ratio is obtained by actuation of the first immobilizing device 13; the transmission of the driving torque from the driving shaft 4 is effected by the casing 15 in the driving direction of the free wheel unit 10 and, through the sleeve 7 the free wheel unit 10 drives the first sun gear 5 and thus the planet gears 24 and 25. The sun gear 6 is held stationary by the first immobilzing device 13 and therefore rotation of the planet gear 24 causes rotation of the planet carrier 23, and the output shaft 9 rigid therewith, in the same direction as that of the engine.

The second transmission ratio is obtained by actuation of the second clutch 16, while the first immobilizing device 13 remains actuated. Transmission from the driving shaft 4 is effected by the casing 15 which is coupled to the casing 18 by the clutch 16, and by means of the annulus gear 22, the casing 18 drives the second set of planet gears 25. Since the sun gear 6 is held stationary, the planet carrier 23 and the output shaft 9 rotate in the same sense as the engine, as indicated above.

The third transmission ratio is obtained by actuation of the first clutch 11 and the second clutch 16, the immobilizing device 13 being inoperative. Transmission is effected from the shaft 4 which drives the sun gear 5 through the sleeve 7 and the annulus gear 22 through the casing 18, so that the conjugated movement of the sun gear 5 and of the annulus gear 22 is transmitted by the planet gears 24 and 25 to the planet carrier 23. The planet carrier 23 and thus the output shaft 9 are driven in the same sense as the engine.

The reverse speed ratio is obtained by actuation of the second immobilizing device 19 and the first clutch 11. The annulus gear 22 is thus held stationary whereby rotation of the sun gear 5 causes the planet carrier 23 and thus the output shaft to be driven in the opposite sense to that of the engine.

FIG. 2 shows a gear box in accordance with the invention, in which the same elements as those in FIG. 1 are indicated by the same reference numerals increased by 200.

As shown in FIG. 2, a third sun gear 226 is provided which meshes with an additional gear 227 of the second set of planet gears 225, the sun gear 226 having a diameter different from that of the sun gear 206.

The third sun gear 226 is rigid with a drum 228 or hub on which driving discs of a third immobilizing device 229 are mounted, stationary discs of the device 229 being rigid with the casing 221. The rotary drum 228 is adjacent to the rotary drum or hub 208a of the first immobilizing device 213 and is situated between this drum and the planet carrier 223.

Two methods of operation of the gear box shown in FIG. 2 are indicated in Tables II and III.

|     | 211 | 216 | 210 | 213 | 219 | 229 |
|-----|-----|-----|-----|-----|-----|-----|
| 1   |     |     | x   |     |     | x   |
| 2   |     | x   |     | x   |     |     |
| II. 3 |   | x   |     | x   |     |     |
| 4   | x   | x   |     |     |     |     |
| Reverse | x |  |     |     | x   |     |

|     | 211 | 216 | 210 | 213 | 219 | 229 |
|-----|-----|-----|-----|-----|-----|-----|
| 1   |     |     | x   |     |     | x   |
| 2   |     | x   |     |     |     | x   |
| III. 3 |  | x   |     | x   |     |     |
| 4   | x   | x   |     |     |     |     |
| Reverse | x |  |     |     | x   |     |

According to the first mode of operation shown in Table II, the first transmission ratio is obtained by actuation of the third immobilizing device 229, and the transmission of the driving torque is effected by the casing 215 in the driving direction of the free wheel unit 210 which drives the first sun gear 205 through the sleeve 207. Since the sun gear 226 is held stationary, the planet carrier 223 (and thus the output shaft 209) rotates in the same sense as the engine, by virtue of the engagement of the gear 227 of the planet gears 225 with the sun gear 226.

Second, third and fourth speed ratios and reverse are obtained in the same way as described for the first, second and third transmission ratios and for the reverse respectively of the gear box illustrated in FIG. 1.

According to the second method of operation shown in Table III, the first transmission ratio is obtained by actuation of the third immobilizing device 229, and transmission of the driving torque is effected by the free wheel unit 210 in its driving direction, as in the preceding case.

The second transmission ratio is obtained by actuation of the third immobilizing device 229 and the second clutch 216, so that the driving shaft 204 is connected to the casing 215 and to the casing 218 by the clutch 216, and the casing 218 drives the second set of planet gears 225 by means of the annulus gear 222. It is apparent from the foregoing and the drawing that the clutch 216 is selectively operable independently of the clutch 211. Since the sun gear 226 is held stationary, the planet carrier 223 (and thus the output shaft 209) rotates in the same sense as the engine by virtue of the engagement of the planet gears 225 with the sun gear 226.

The third and fourth transmission ratios and reverse are obtained in the same way as the second and third transmission ratios and reverse, respectively, as described for the gear box shown in FIG. 1.

FIG. 3 shows an embodiment in which the input shaft 204 and the output shaft 209 are arranged coaxially on the same side of the gear box, whereas in the constructions shown in FIGS. 1 and 2 the input shaft is situated on the opposite side to the output shaft.

Thus, as particularly described, the previously proposed three-speed gear box can be modified to form a four-speed gear box by the incorporation of relatively few additional parts.

What is claimed is:

1. In an epicyclic gear box having four forward speed ratios and one reverse speed ratio,
   input shaft means,
   output shaft means,
   first sun gear means,
   second sun gear means,
   annulus gear means,
   planet gear carrier means,
   first planet gear means carried by the carrier means,
   second planet gear means carried by the carrier means, said first and second planet gear means being in mesh with each other, said first planet gear means being in mesh with the first sun gear means, and said second planet gear means being in mesh with the second sun gear means and with the annulus gear means,
   a first immobilizing device having a rotary drum rotatable with said second sun gear means,
   a second immobilizing device connected with said annulus gear means,
   a first clutch means connected to said input shaft means and associated with said first sun gear means, and
   a second clutch means connected to said input shaft means and associated with said annulus gear means, the improvement comprising:
   third sun gear means, and
   a third immobilizing device including hub means rotatable with the third sun gear means, the hub means of the third immobilizing device being located axially beside the rotary drum of the first immobilizing device and between the rotary drum of the first immobilizing device and the planet gear carrier means, said third sun gear means co-operating with the third immobilizing device whereby the third immobilizing device is operative to selectively hold stationary the third sun gear means, and the third sun gear means meshing with the second planet gear means, said immobilizing devices and said first and second clutch means being selectively operative independently of each other to provide the selected forward or reverse speed ratio.

2. A gear box as claimed in claim 1 wherein the input and output shaft means are arranged on opposite sides of the gear box.

3. A gear box as claimed in claim 1 wherein the input and output shaft means are arranged at the same side of the gear box and are concentric.

* * * * *

UNITED STATES PATENT OFFICE
CERTIFICATE OF CORRECTION

PATENT NO. : 3,857,303

DATED : DECEMBER 31, 1974

INVENTOR(S) : ANDRE MOUTTET

It is certified that error appears in the above-identified patent and that said Letters Patent are hereby corrected as shown below:

Item [30] Foreign Applications Priority Data, should read as follows:

--- June 8, 1972     France .......... 72.20670 ---.

Signed and sealed this 20th day of May 1975.

(SEAL)
Attest:

RUTH C. MASON
Attesting Officer

C. MARSHALL DANN
Commissioner of Patents
and Trademarks